US012587565B1

(12) United States Patent
Babon

(10) Patent No.: US 12,587,565 B1
(45) Date of Patent: Mar. 24, 2026

(54) MULTI-MODEL DETECTION OF MALICIOUS URL USING ITS NETWORK

(71) Applicant: Trend Micro Incorporated, Tokyo (JP)

(72) Inventor: Paul Miguel Babon, Mandaluyong (PH)

(73) Assignee: Trend Micro Incorporated, Tokyo (JP)

( * ) Notice: Subject to any disclaimer, the term of this patent is extended or adjusted under 35 U.S.C. 154(b) by 47 days.

(21) Appl. No.: 18/648,120

(22) Filed: Apr. 26, 2024

Related U.S. Application Data

(60) Provisional application No. 63/619,592, filed on Jan. 10, 2024.

(51) Int. Cl.
| | |
|---|---|
| *H04L 9/40* | (2022.01) |
| *G06F 16/955* | (2019.01) |
| *H04L 9/32* | (2006.01) |
| *H04L 67/02* | (2022.01) |
| *H04L 67/306* | (2022.01) |

(52) U.S. Cl.
CPC ...... *H04L 63/1483* (2013.01); *G06F 16/9566* (2019.01); *H04L 9/3247* (2013.01); *H04L 63/1416* (2013.01); *H04L 67/02* (2013.01); *H04L 67/306* (2013.01)

(58) Field of Classification Search
CPC .............................. H04L 67/02; G06F 16/2477
See application file for complete search history.

(56) References Cited

U.S. PATENT DOCUMENTS

| | | | | |
|---|---|---|---|---|
| 2018/0176241 | A1* | 6/2018 | Manadhata | ........... H04L 67/306 |
| 2021/0099485 | A1* | 4/2021 | Lancioni | ................ H04L 67/02 |
| 2023/0353595 | A1* | 11/2023 | Hu | ......................... G06N 3/045 |

(Continued)

FOREIGN PATENT DOCUMENTS

WO        2019/014527        1/2026

OTHER PUBLICATIONS

Pujitha Vemuri, "Detecting Malicious Shortened URLS Using Machine Learning", Sacramento State University Library, https://scholars.csus.edu/esploro/outputs/graduate/Detecting-malicious-shortened-URLs-using-machine/99257831032201671#file-0, 2018.

(Continued)

*Primary Examiner* — Barbara B Anyan
(74) *Attorney, Agent, or Firm* — Beyer Law Group LLP

(57)        ABSTRACT

A URL is input into a virtual browser of a crawler which requests that URL and all of its resource URLs in order to form a network graph. Network features are extracted. An identity stage uses an identity model based upon lexical and host features to determine if the input URL and resource URLs are malicious or benign. A similarity stage uses a similarity model and similarity functions to produce a similarity score between each pair of the input URL and a resource URL. An activity stage uses an activity model to determine if the input URL's network is malicious or benign based upon the network graph and extracted network activity features. Edges of the graph are weights, similarity scores, attributes or network features. A finality stage concludes malicious if the identity stage concluded that the URL was malicious or the activity stage concluded that the URL's network was malicious.

19 Claims, 14 Drawing Sheets

(56) References Cited

U.S. PATENT DOCUMENTS

| | | | |
|---|---|---|---|
| 2024/0095029 A1* | 3/2024 | Rowlands | .............. H04L 9/3247 |
| 2024/0095337 A1* | 3/2024 | Rowlands | ............. G06F 21/577 |

OTHER PUBLICATIONS

Neha Gupta, Anupama Aggarwal, Ponnuarangam Kumaraguru, "bit.ly/malicious: Deep dive into short URL based e-crime detection", IEEE Xplore, https://arxiv.org/pdf/1406.3687, 2014.

Raj Kumar Nepali, Yong Wang, "You Look Suspicious!!: Leveraging Visible Attributes to Classify Malicious Short URLs on Twitter", IEEE Computer Society, 2016.

MD. Sabeeha, SK. Karimullah, P. Babu, "Detection of Malicious URLs by Correlating the Chains of Redirection in an Online Social Network (Twitter)", ARC, https://www.arcjournals.org/pdfs/jrscse/v1-13/6.pdf, Jul. 2014.

Yun Zhou, Peichao Wang, "Computers and Security: An ensemble learning approach for XSS attack detection with domain knowledge and threat intelligence", Elsevier Ltd., 2019.

Yuan Liu, Wenbing Zhao, Dan Wang, Lihua Fu, "A XSS Vulnerability Detection Approach Based on Simulating Browser Behavior", IEEE, 2015.

Tristan Bilot, Gregoire Geis, Badis Hammi, "PhishGNN: A Phishing Website Detection Framework using Graph Neural Networks", HAL Open Science, https://hal.science/bal-04401167/document, Jul. 2022.

Yonghong Huang, Joanna Negrete, John Wagener, Celeste Fralick, Armando Rodriguez, Eric Peterson, Adam Wosotowsky, "Graph neural networks and cross-protocol analysis for detecting malicious IP addresses", Springer Link, https://link.springer.com/article/10.1007/s40747-022-00838-y, Sep. 14, 2022.

Yilin Wang, Siqing Xue, Jun Song, "A Malicious Webpage Detection Method Based on Graph Convolutional Network", https://www.mdpi.com/2227-7390/10/19/3496, Mathematics, 2022.

Kayce Basques, "Inspect network activity", Chrome for Developers, https://developer.chrome.com/docs/devtools/network, Downloaded Jun. 20, 2024.

"CDPSession class", Puppeteer, https://pptr.dev/api/puppeteer.cdpsession, Downloaded Jun. 20, 2024.

"Requests: HTTP for Humans", Requests, https://requests.readthedocs.io/en/latest/#, Downloaded Jun. 21, 2024.

Julio Pontes, "tunetheweb/wappalyzer", GitHub, https://github.com/tunetheweb/wappalyzer/tree/master?tab=readme-ov-file#readme, Downloaded Jun. 20, 2024.

"Whois/Registration Data Access Protocol (RDAP)", ARIN American Registry for Internet Numbers, https://www.arin.net/resources/registry/whois/rdap/, Downloaded Jun. 21, 2024.

Pierre Geurts, Damien Ernst, Louis Wehenkel, "Extremely randomized trees", Springer Link, https://link.springer.com/article/10.1007/s10994-006-6226-1, Mar. 2, 2006.

Liudmila Prokhorenkova, Gleb Gusev, Aleksandr Vorobev, Anna Veronika Dorogush, Andrey Gulin, "CatBoost: unbiased boosting with categorical features", Cornell University, https://arxiv.org/pdf/1706.09516, Downloaded Jun. 20, 2024.

B.K. Lavine, T.R. Blank, "Feed-Forward Neural Networks", Elsevier B.V., 2009.

A.K. Jain, M.N. Murty, P.J. Flynn, "Data Clustering: A Review", ACM Computing Surveys, https://dl.acm.org/doi/pdf/10.1145/331499.331504. Sep. 1, 1999.

Joseph Lee Rodgers, W. Alan Nicewander, "Thirteen Ways to Look at the Correlation Coefficient", The American Statistician, vol. 42, No. 1, https://www.stat.berkeley.edu/~rabbee/correlation.pdf, Feb. 1988.

Peipei Xia, Li Zhang, Fanzhang Li, "Information Sciences: Learning similarity with cosine similarity ensemble", Elsevier Inc., 2015.

Thomas N. Kipf, Max Welling, "Semi-Supervised Classification with Graph Convolutional Networks", https://arxiv.org/pdf/1609.02907, 2017.

Michael Schlichtkrull, Thomas N. Kipf, Peter Bloem, Rianne van den Berg, Ivan Titov, Max Welling, "Modeling Relational Data with Graph Convolutional Networks", https://arxiv.org/pdf/1703.06103, 2017.

"conv.RGCNConv", PyG Team, https://pytorch-geometric.readthedocs.io/en/latest/generated/torch_geometric.nn.conv.RGCNConv.html, Downloaded Jun. 20, 2024.

Petar Veličković, Guillem Cucurull, Arantxa Casanova, Adriana Romero, Pietro Liò, Yoshua Bengio, "Graph Attention Networks", https://arxiv.org/pdf/1710.10903, 2018.

Shaked Brody, Uri Alon, Eran Yahav, "How Attentive are Graph Attention Networks?", https://arxiv.org/abs/2105.14491, 2022.

* cited by examiner

Accessibility Stage

Crawler — 32

URL    20

URL 1    33

URL 2    34

URL n    35

Edge 1    37

Edge 2    38

Edge n    39

FIG. 2

Identity Stage

Aggregation of Identity Predictions

Similarity Stage

20    33    20    34    20    35

| URL | URL 1 | URL | URL 2 | URL | URL n |

EUC | MIN | PEA | JAC | COS    ~72

Edge 1          Edge 2          Edge n 73              74              75

FIG. 4A

Aggregation of Similarity Predictions

Activity Stage

Extract Network Features
Based Upon Original URL

Crawler Service Inputs Original URL 　204

Collect Resource URLs Requested 　208

Extract Network Features 　212

END

MULTI-MODEL DETECTION OF MALICIOUS URL USING ITS NETWORK

This application claims priority of U.S. provisional patent application No. 63/619,592, filed Jan. 10, 2024, entitled "BehaveURL: Analysis Through Multi-Model Detection of a URL Using Its Network," which is hereby incorporated by reference.

FIELD OF THE INVENTION

The present invention relates generally to URL reputation and detection. More specifically, the present invention relates to detection of malicious URLs using multiple models.

BACKGROUND OF THE INVENTION

Users of computer systems are at risk of malicious software from any number of vectors, including accessing a URL. A URL, when accessed, may connect to several different Web sites (or "resources") within its network to perform different operations and behaviors. But, these resources can be compromised and most competent malware detection systems only use the URL's content and metadata for analysis.

Given a URL, most detection systems will emphasize analysis of its structure and sometimes its content before providing a safe or unsafe classification. If that is not enough, other complex methods such as image analysis, natural language processing, or external blocklist checking through IoC listings further drives the evolution of URL detection. Yet despite these advancements, certain Web threats may still thrive throughout a network. As mentioned, to detect Web threats and suspicious URLs, Web reputation systems use a Web site's metadata and HTML content as evidence. But this evidence can be hidden and manipulated by attackers using Open Redirect vulnerabilities, abused redirection URL services or cross-site scripting attacks. Hence, most reputation systems become less reliable and take a reactive approach by relying on third-party detection services or IoC listings instead. Numerous URL detection systems are in use, but each has its own drawbacks when it comes to accurately detecting malicious URLs.

TinyURL, the first known URL Shortening Service (USS), shortens various URLs to make them memorable (and bypass restrictions that limited character lengths over the average length of a URL structure). The technique is simple: a URL is given a unique identifier stored in a USS; once a shortened URL with that exact identifier is accessed, it will redirect back to the original URL. As early as 2004, USSs were a common tactic for malicious URL obfuscation. This means that a malicious URL can be transformed into a more secure, but abused, shortened URL with its domain and path being completely invisible to the user. USSs defeat the purpose of domain reputation systems as the actual domain is hidden until the shortened URL is accessed. And, unfortunately, phishing short URLs can still be active for three to ten months, while malware short URLs can last one to five years. And since a single change of character within the original URL still qualifies to be assigned a unique identifier, a malicious attacker can still send out different shortened URLs appearing visually as the same Web page despite redirecting on a visually similar Web page.

In a vulnerability known as Cross-Site Scripting (XSS), malicious domains are inserted in legitimately-looking images, hyperlinks, and texts within a Web site's content.

But, the most dangerous type of XSS is persistent XSS (or stored XSS), where interaction is not required for a script to execute as it is already stored on the Web site's server. The user needs only to visit the Web page before being compromised. XSS consistently ranks first or second as the most dangerous software weaknesses.

An Open Redirect (OR) is a weakness of an application when it allows unauthorized redirections to a URL based on user inputs. A straightforward example is when a URL that promotes a redirection based on its parameter is modified to accommodate a malicious redirection instead. Google has taken minimal steps to make their links more secure: a warning message is displayed to inform users of redirection, but this can be disabled if the URL's parameters were modified. Google has even given their opinion that their redirection feature has legitimate uses for Web searching. Like USSs, ORs can be challenging for Web detection systems as the main domain is inherently legitimate. Even if the malicious link can be extracted from the parameter, the method of parsing the structure can vary for each URL. For example, a malicious URL can successfully be extracted from a redirection parameter if defined explicitly but not if defined as part of another OR-abused domain which is a common structure for Google ORs.

Accordingly, there is a need for reputation and detection systems to learn more about the structure of a URL based upon its network, its linked Web sites and resource URLs to that shape its behavior in order to provide more accurate detection.

SUMMARY OF THE INVENTION

To achieve the foregoing, and in accordance with the purpose of the present invention, a multi-model URL detection system is disclosed that analyzes and detects malicious URLs using the network of a URL.

In general, the present invention reimagines how related Web sites are analyzed: instead of using external and obvious reputation data, we analyze how Web sites are built based upon its intentions on its network. Given the changing landscape of URLs, evidence is more reliant on how a URL behaves. The present invention determines the connected Web sites of a given URL, explores each Web site's metadata, similarities between these Web sites, and the layout of the network graph, all contributing to the reputation of the given URL.

In a first embodiment, a method requires a uniform resource locator (URL) as an input. The input URL is accessed using a virtual browser. The browser monitors and collects a number of resource URLs requested by the input URL in the network. The input URL, resource URLs, and network features are the method's output.

In a second and third embodiment, the method inputs host or lexical features of the input URL into the identity model to determine if the input URL is malicious or benign. Extraction of host features should require an internet connection. The features and the malicious or benign decision are the method's outputs. The method is also applied to each resource URLs.

In a fourth embodiment, the method inputs a pair of features and malicious or benign decisions from the input URL and a resource URL. It also creates additional comparison (same) features between the pair of URLs. The decision and features are inputs into the similarity model, which calculates a similarity score between two websites to determine how similar or different they are. The similarity score are the method's outputs. The method is also applied for each resource URL connected by the input URL.

In a fifth embodiment, the method constructs the input URL's network graph based on the outputs of the previous embodiments. It also creates additional input network summary (netsum) features defined from the constructed network. The graph and features are inputs into the activity model to determine if the input URL's network is malicious or benign. This decision is the method's output.

In a sixth embodiment the method determines that the input URL is malicious when either of the identity model or the activity model outputs a malicious decision.

BRIEF DESCRIPTION OF THE DRAWINGS

The invention, together with further advantages thereof, may best be understood by reference to the following description taken in conjunction with the accompanying drawings in which:

FIG. 2 illustrates in greater detail accessibility stage.

FIG. 4A illustrates in greater detail similarity stage.

FIG. 9 is a flow diagram describing operation of the similarity stage to determine if two URLs are similar.

DETAILED DESCRIPTION OF THE INVENTION

Figure 1:
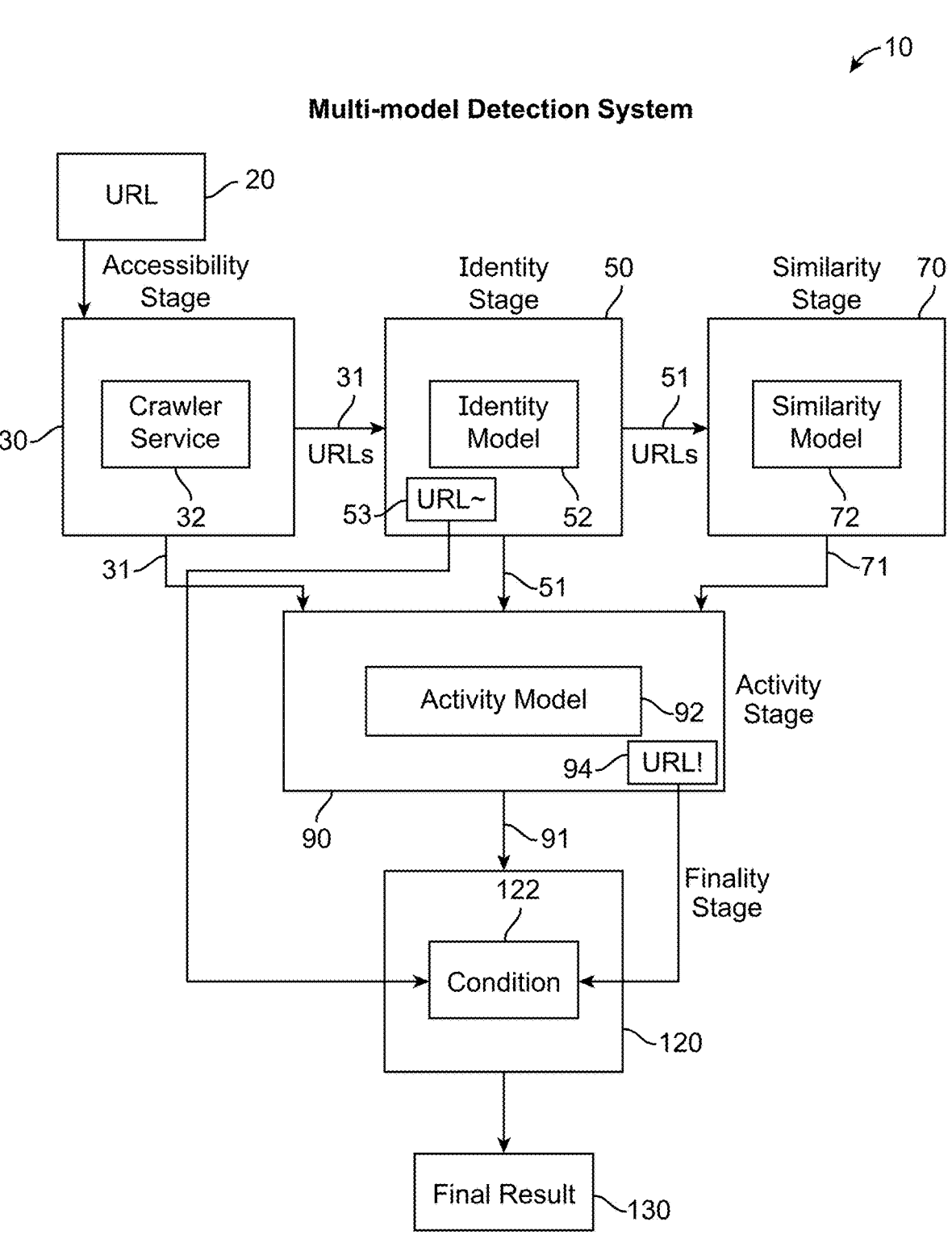
FIG. 1 illustrates a multi-model detection system according to one embodiment of the invention.

I describe a multi-model classifier that identifies and classifies these threats circulating around the Web, i.e., a URL detection system. Multiple models are used, some for data comparison and graph associations.

A URL performs several HTTP requests and responses, executes scripts, and retrieves a variety of resources before displaying its Web page to the user. These behaviors are monitored through the network by the detection system in which models analyze a URLs' characteristics (identity), relationships (similarity), and personalities (activity). The URL detection system does not use any third-party services which require payment or a free trial for feature extraction and data processing (which may require payment if deployed in a production environment).

More specifically, this multi-model detection system detects malicious URLs using API-independent features, similarity learning, and a graph convolutional network. The detection system comprises of five stages: an accessibility stage which crawls URLs using a virtual browser; an identity stage which classifies URLs as safe or unsafe using features extracted without the use of any paid or trial-based third-party API; a similarity stage which classifies pairs of URLs as similar or dissimilar using similarity learning; an activity stage which classifies a URL's network as safe or unsafe using graph convolutional networks; and a finality stage which generates a final safe or unsafe classification (i.e., benign or malicious) for URLs.

Related URL Detection Systems and Classifiers

It is realized that other URL detection systems and classifiers have limitations in detecting unsafe or malicious URLs that use USSs, XSSs, ORs, or a Siamese network, and that the multi-model detection system has advantages over these other systems and classifiers.

For detecting unsafe URLs using USSs, the common approach accesses the shortened URL to determine its final redirected Web site; accessing the shortened URL is part of the data collection process, but not part of the general detection system. The multi-model detection system has a built-in crawler to automatically crawl the shortened URL and retrieve the final URL. This crawler also serves as a cheaper alternative to APIs that may only receive additional data from specific USSs such as Twitter and Bitly. The advantage of a crawler over other techniques is as follows. The use of APIs such as Twitter or Bitly is only applicable to its respectively owned domains (t.co, or bit.ly). APIs from direct Web analysis tools such as any.run or urlscan.io offer a virtual scan of any URL string, but require a connection with their servers and its subjection to rate limiting and possibly additional API fees. A built-in crawler enables a local and flexible solution for URLs of different domains and structures whilst generating a controllable structured network data output and is mainly dependent on the local environment's resources to access as much URLs as possible.

For unsafe URLs targeted by XSS attacks, the common approach is to identify common keywords and characters in a Web page where the malicious script is usually injected; this also includes extracting the keywords of the script itself to check if it will behave in a dangerous manner once it is executed. There are two reasons as to why the multi-model detection system does not include JavaScript keywords and characters as features: a) varying script obfuscation techniques remains a constant challenge for machine learning classifiers, that is, script obfuscation is a technique of converting human-readable code into a version where it is difficult to interpret; and cost and storage concerns, that is, script extraction requires HTML content extraction, which is doable for the initial data of 20,000 main URLs but is time-consuming for the other 500,000 URLs that were crawled from each main URL.

For unsafe URLs with ORs, Tripp et al. (2014) describes a classifier tool called Aletheia. It organizes and customizes security reports without the need for manual review. One of its features includes the detection of certain JavaScript assignment operations that may cause an open-redirect attack if replaced. This tool, however, is meant to detect vulnerabilities instead of actual attacks; detecting attacks is a capability of the multi-model detection system.

A Siamese Network URL detection system by Wood-bridge et al. in 2018 detects homoglyph attacks (e.g. http://go00oogle.com), this process inputs two URLs, converts each into an image, and then generates a similarity score based on visual appearance—a common approach in most applications of the Siamese Network as it is purposed for image comparisons. The multi-model detection system, instead of checking on appearance, takes into consideration other metadata information between the two URLs. In this manner, URLs do not need to be converted into image vectors as inputs to the Siamese Network; the metadata features of the two URLs can be passed directly. The Siamese Network of the multi-model detection system gives lower similarity scores to URLs that are unrelated to each other in order to identify unsafe URLs in the network when accessing compromised Web sites, while the goal of the prior art Siamese Network is to give a higher similar score to visually similar URLs. Further, the prior art Siamese Network's similarity computation takes input of strings-turned-images which is used for reference searching of similar and possibly spoofed strings, whereas the Siamese Network of the multi-model detection system does not take into consideration the visual appearance of the URL. While the prior art Siamese Network uses the image vectors as features for comparison, the multi-model detection system makes use of the domain information and metadata of the URL instead. For example, "google.com" and "gmail.com" might not exactly be similar in terms of appearance, but metadata-wise, they are the same as both are owned by Google. Bhurtel et al. (2022) also makes use of the Siamese Network to compare the logotypes of phishing Web pages and determine if the phishing site is hosted under the same address as the company it is targeting; this approach, however, requires extracting HTML content.

The use of Graph Neural Networks (GNNs) in URL detection is uncommon. It is realized that mapping the URL's network traffic as a network graph has not yet been performed concerning GNNs for URL detection.

Overview of the Multi-Model Detection System

FIG. 1 illustrates a multi-model detection system 10 according to one embodiment of the invention. Included are five stages: an accessibility stage 30—comprises of a crawler service 32 that crawls an input URL 20 while monitoring the network traffic and extracting network features; an identity stage 50—comprises of a identity model 52 that classifies a URL as "safe" or "unsafe" based on lexical and domain information; a similarity stage 70—comprises of a similarity model 72 that compares two URLs based on the information provided by the identity stage 50 and generates a similarity score; an activity stage 90—comprises of an activity model 92 that classifies a network graph, mapped out by the accessibility, identity, and similarity stages, as "safe" or "unsafe"; and a finality stage 120—comprises of a condition 122 that outputs an "unsafe" prediction 130 if either the identity or activity model returns an "unsafe" prediction 53 or 94.

In order to train system 10, URL data were extracted from an internal database that were recorded from January to June 2023. For the entirety of the training, validation, and testing phases, a set of 23,400 URLs was utilized, 60% used for the training data, 13% for the validation data, and 27% for the test data. The dataset used encompasses a mix of URL types, including: IP addresses and domains identified as Indicators of Compromise (IoCs) from various sources, random content from social media platforms, tracking and phishing links extracted from spam e-mail messages, as well as domains created within 2023.

Figure 2:
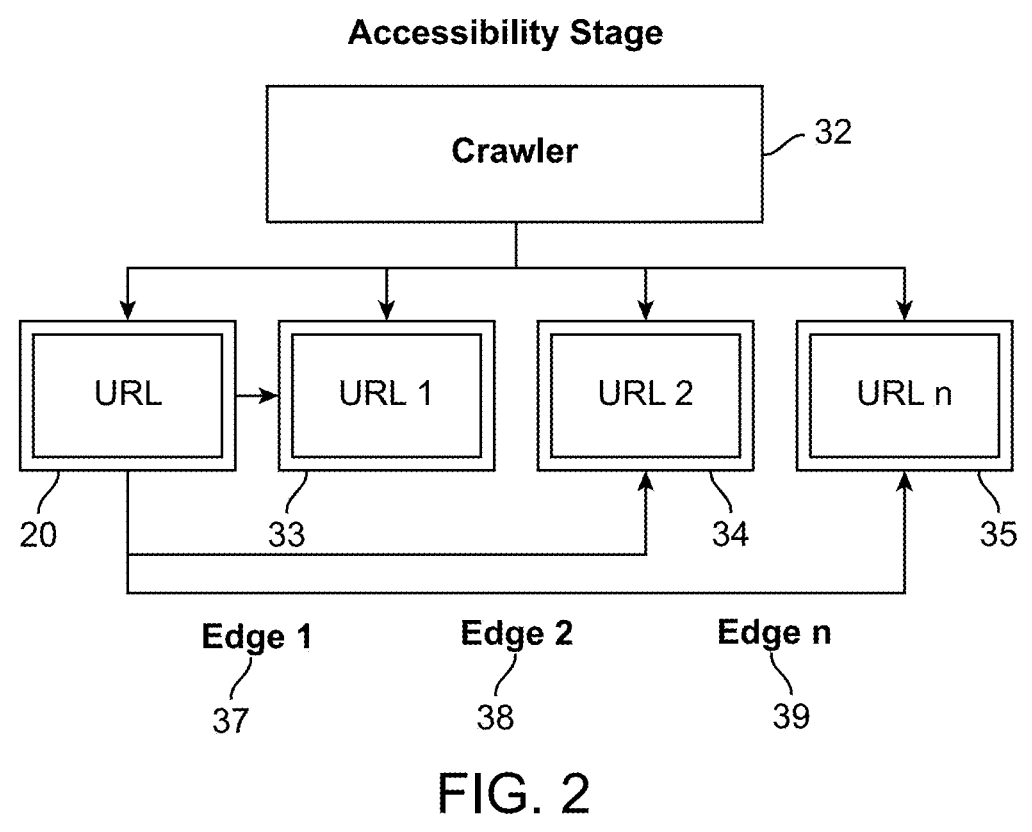
Figure 5A:
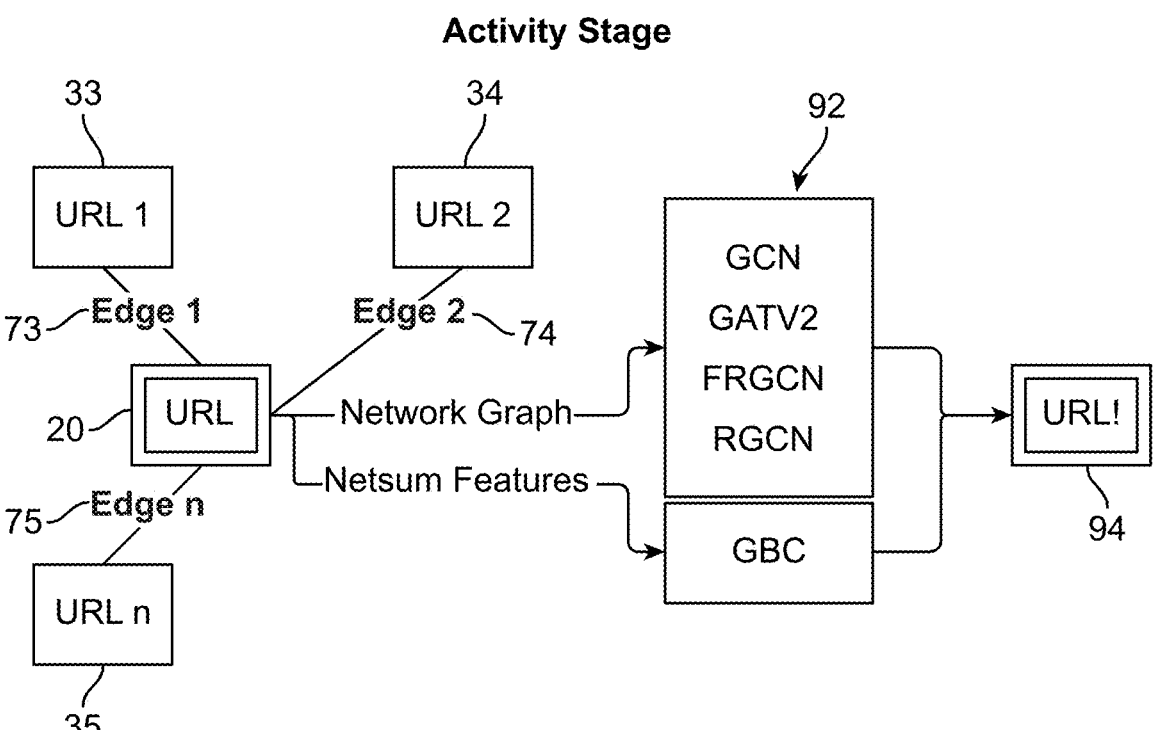
FIG. 5A illustrates in greater detail an activity stage that determines if a URL's network is safe or unsafe.

FIG. 2 illustrates in greater detail accessibility stage 30. Shown is crawler service 32, original URL 20 and any number of requested URLs 33-35, also known as resource URLs. Edges 37-39 represent the links between URL 30 and the resource URLs, such as is shown in FIG. 5A. They may have different values, depending upon to which algorithms they are fed, by way of example, each edge may represent the similarity score between a pair of URLs.

Figure 3A:
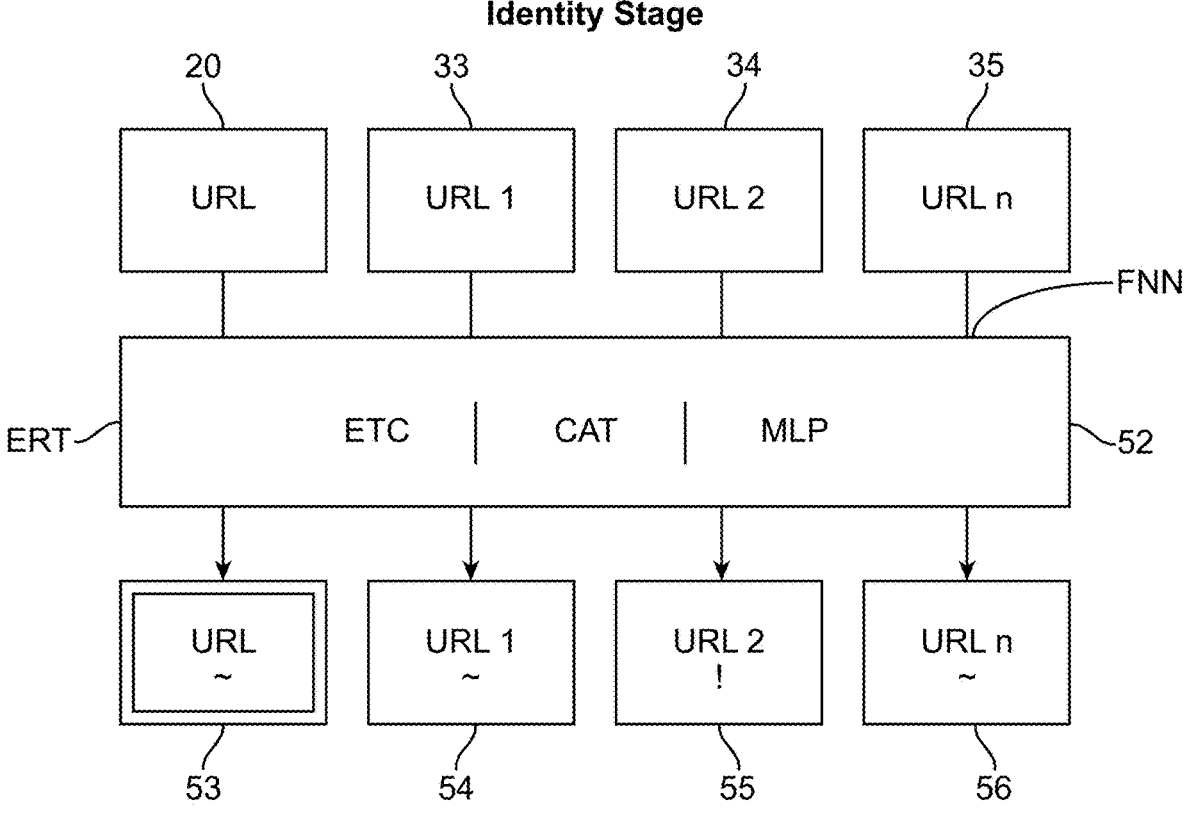
FIG. 3A illustrates in greater detail identity stage that determines whether a particular URL is safe or unsafe (i.e., benign or malicious).

FIG. 3A illustrates in greater detail identity stage 50 that determines whether a particular URL is safe or unsafe (i.e., benign or malicious). Shown is original URL 20, requested URLs 33-35, and identity model 52 which is a multi-classifier model having one or more algorithms, including an Extremely Randomized Trees (ERT) algorithm, a CatBoost (CAT) algorithm, and a Feed Forward Network (FNN) algorithm. Output is a classification of each URL 53-56 as being benign "~" or malicious "!".

Figure 3B:
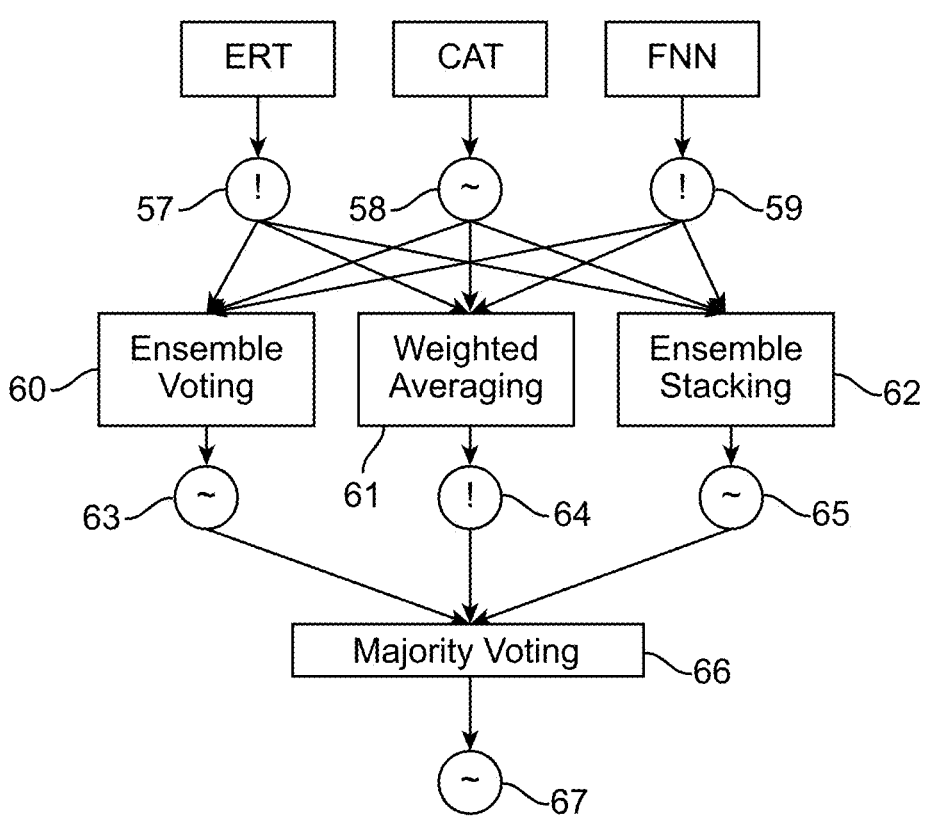
FIG. 3B illustrates the aggregation of identity predictions of model to produce a classification for particular URL.

FIG. 3B illustrates the aggregation of identity predictions of model 52 to produce a classification for particular URL. Shown are the three algorithms, each having an output classification 57-59, three methods 60-62 of aggregating the classifications, an output aggregation result 63-65 for each method of aggregating, a majority voting 66 step, and a final prediction 67 for a particular URL.

Figure 4A:
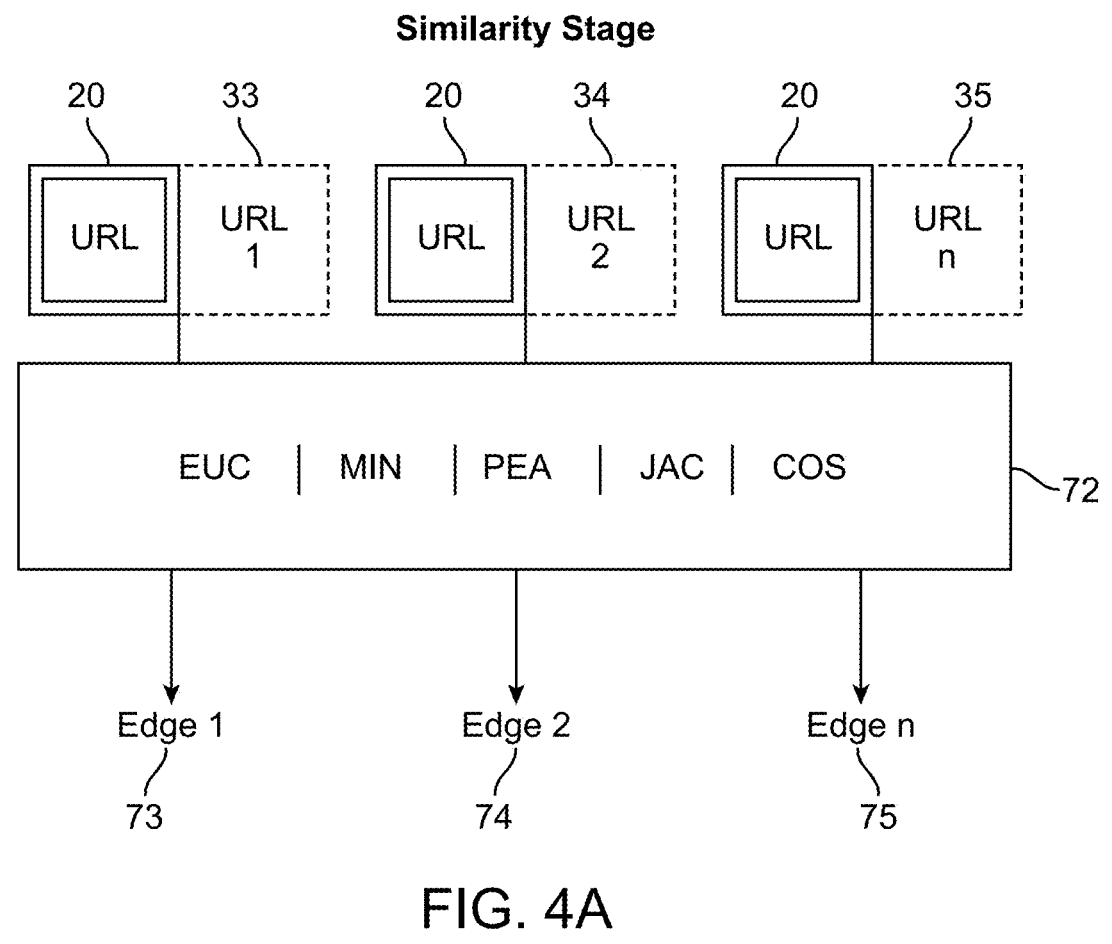

FIG. 4A illustrates in greater detail similarity stage 70. Included are input pairs of URLs, 20 and 33, 20 and 34, 20 and 35, etc. Shown is the similarity model 72 which generates a similarity score between each pair of URLs based upon information provided by identity stage 50. Model 72 includes a main algorithm which is the Siamese Neural Network (SNN) and any number of similarity functions such as Euclidean Distance (EUC), Minkowski Distance of Order 3 (MIN), Pearson Correlation Coefficient (PEA), Jaccard Similarity Index (JAC), and Cosine Similarity (COS). Output for each pair of URLs is a final score of the model shown as edge 73 for the first pair, edge 74 for the second pair, edge 75 for the nth pair, etc.

Figure 4B:
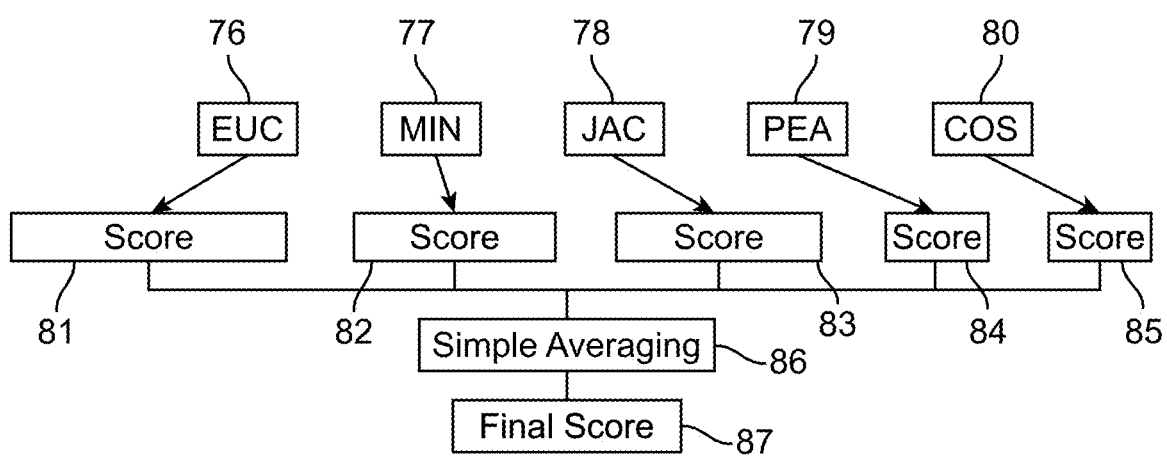
FIG. 4B illustrates the aggregation of similarity predictions by a model.

FIG. 4B illustrates the aggregation of similarity predictions by model 72. Shown are each of the similarity functions 76-80, an output score 81-85 for each function, a simple averaging step 86, and a final score for a particular pair 87.

FIG. 5A illustrates in greater detail activity stage 90 that determines if a URLs network is safe or unsafe. Shown is original URL 20, requested URLs 33-35, edges 73-75, activity model 92, and a final output prediction 94 for the original URL. Activity model 92 includes four algorithms relating to Graph Neural Networks (CNN) and a fifth simple classifier algorithm, the Gradient Boosting Classifier (GBC). The first algorithm is the Graph Convolution Network (GCN), the second is the Relational Graph Convolutional Network (RGCN), the third is the Fast Relational Graph Convolutional Network (FRGCN), and the fourth is based on the Graph Attention Networks, the GATV2.

Figure 5B:
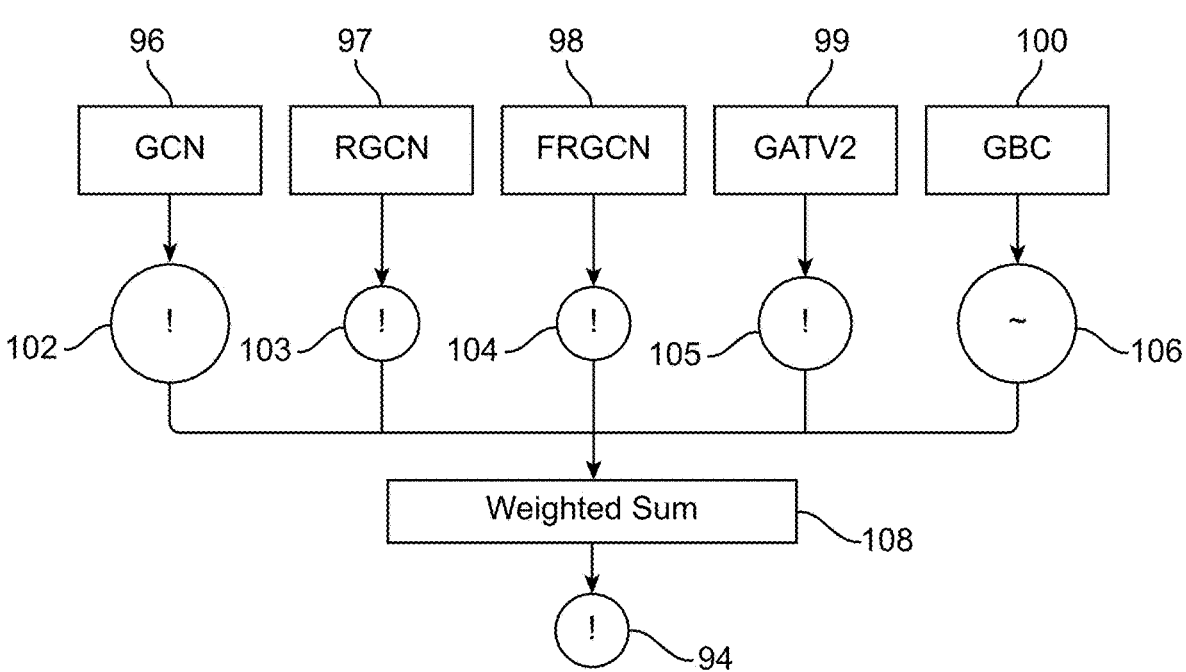
FIG. 5B illustrates in greater detail the aggregation of activity predictions using the various algorithms of a model.

FIG. 5B illustrates in greater detail the aggregation of activity predictions using the various algorithms of model 92. Shown are the four neural network algorithms and the classifier algorithm 96-100, a result 102-106 from each algorithm, a weighted sum step 108, and a final weighted sum 94.

Figure 6:
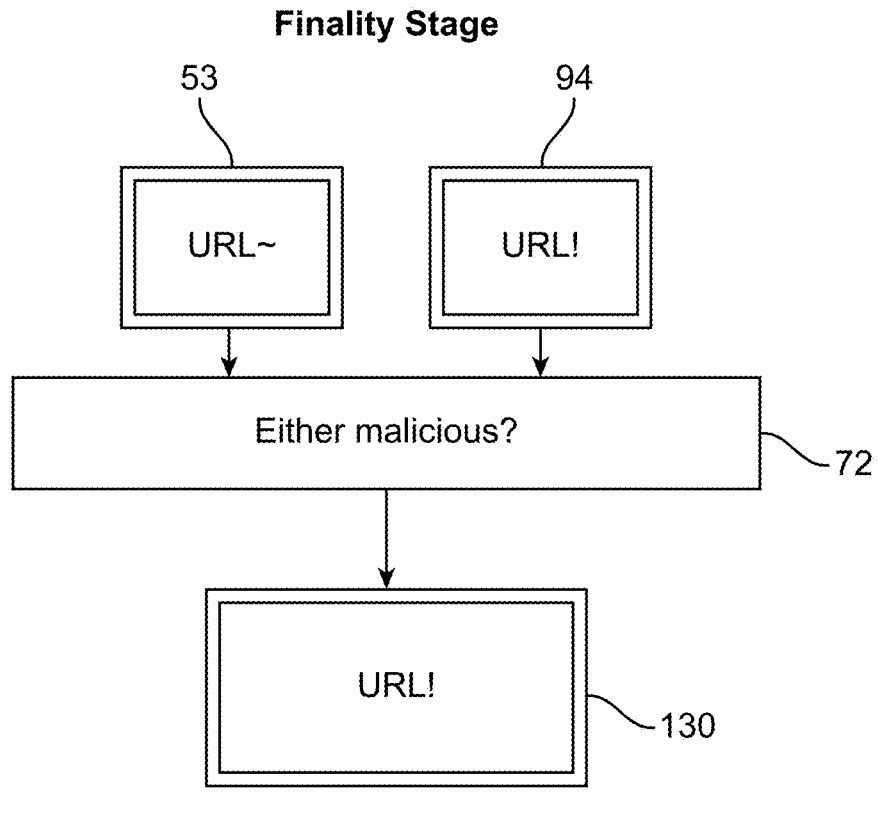
FIG. 6 illustrates in greater detail the finality stage including a condition (or other more complex logic).

FIG. 6 illustrates in greater detail the finality stage 120 including a condition (or other more complex logic) 122. Inputs are classifications for URL 53 and URL's network 94, a particular condition 122, and a final result 130 for the original URL 20.

Flow Diagrams for the Multi-Model Detection System

Figure 7:
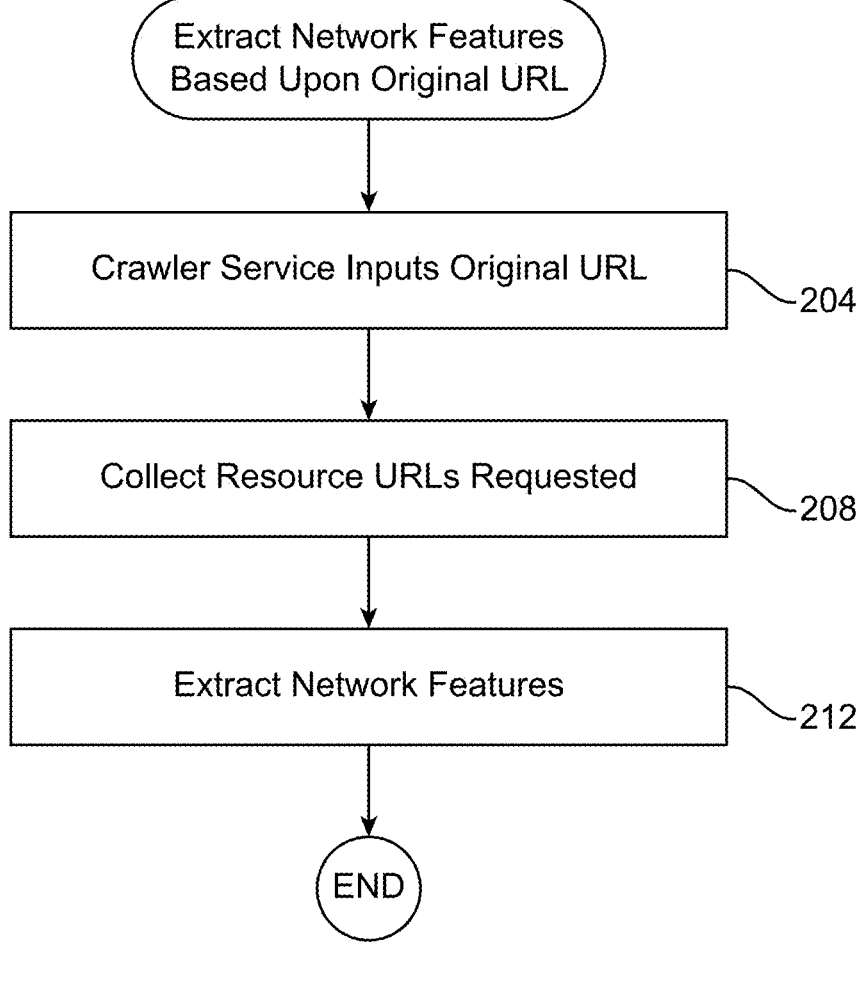
FIG. 7 is a flow diagram describing operation of the accessibility stage and extraction of network features based upon an original URL.

FIG. 7 is a flow diagram describing operation of the accessibility stage 30 and extraction of network features based upon an original URL. In step 204, given an input URL, a service 32 accesses it in a secured simulated browser, extracts as much network information available, and collects each of the URLs that the URL is requesting. The input URL may be referred as the "original URL" and the requested URLs may be referred to as "resource URLs." Resource URLs can refer to any type of URLs that the original URL interacts with (e.g. embedded image links, external scripts, redirections performed by the server, HTML headers, or JavaScript files). Any particular crawling service may be used, in one specific embodiment the Puppeteer service is used. This virtual browser is initiated by a script and accesses the original URL; there is no need for a person to click links manually. The first URL being requested will be the original URL itself, as this initializes its own network traffic. The collection of these resource URLs are the network of the original URL.

While the detection system 10 can detect threats in the landscape of cyber security, it can be adopted in other applications and the original URL may come from a variety of sources in other applications, including: IoT and Web applications used for monitoring URLs in order to track local networks and check if home devices are connecting to a suspicious Web site; misinformation filters used to flag false news Web sites if they reference or connect to an irrelevant or disreputable source; and Web crawling and page ranking used for filtering related or foreign URLs by scanning a Web site's HTML content to check if it references suspicious or compromised domains.

From there, a variety of, and any number of, network features may be extracted such as the resource URLs being requested by the original URL, and any number of network features. Step 208 extracts and collects any number of requested resource URLs, such as URLs 33-35. In step 212 any number of network features are extracted such as the amount of time it takes to request to and respond from a resource URL, the response status code of each resource URL, the resource type of the resource URL, a network request indicator, a network response indicator, the type of resource requested, the type of resource that responded, etc. In one particular implementation, there are a total of 214 features extracted at this stage (network requests and network responses). As there is a wealth of data residing in the URL network, it is a design choice as to which type of network data to extract. In this embodiment, only network features relating to requests and responses are extracted as they provide a great deal of information on the original URLs relationship with the resource URLs. These network features are input later into the activity stage.

The use of Puppeteer's virtual browser is useful as it can match the behavior of a URL as if it were accessed by an actual browser. This means that the virtual browser can replicate any redirection behaviors of a shortened URL or of a URL compromised with an OR attack, a response which cannot be done using static analysis or basic HTTP requests. Third-party expansion services such as "urlex.org" or "urlscan.io" can also record redirection behaviors but only for a limited run time and do not provide the same amount of network information and customizability as Puppeteer. Puppeteer's virtual browser can also execute scripts that attempt any type of redirections or connections which cannot be done by a standard HTTP library like the Requests module in Python. Any script automatically executed during the accessibility stage 30 is also counted as a resource URL. Therefore, persistent XSS attacks via malicious scripts are also logged and collected during this stage.

Further, design choices may be made regarding performance and accuracy. The time to collect resource URLs will depend upon the Internet connection speed, the original URL's server location and behavior, and the amount of time allowed before stopping. In one implementation, a timeout of 30 seconds is used and any potential resource URL being requested after 30 seconds is not recorded in the network traffic. Of course, this timeout may be changed.

Figure 8:
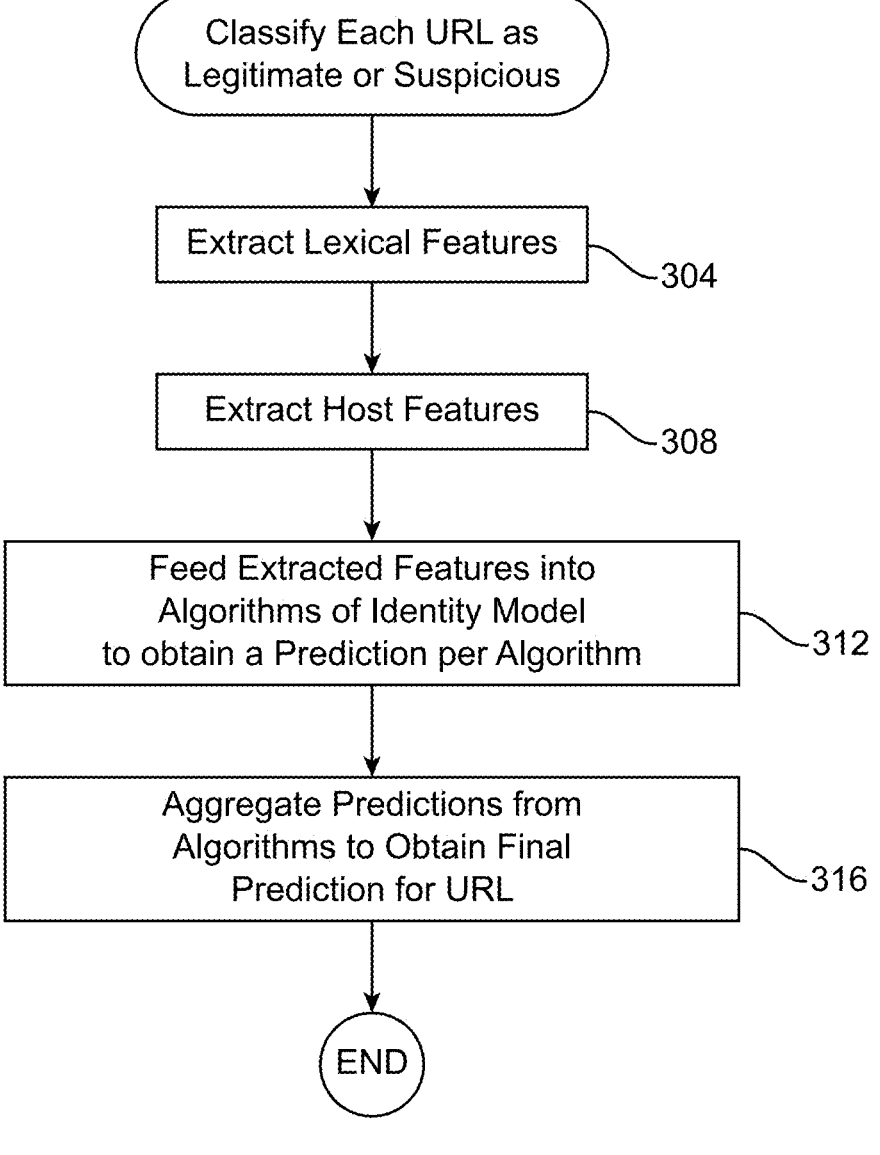
FIG. 8 is a flow diagram describing operation of the identity stage to determine if a URL is legitimate or suspicious.

FIG. 8 is a flow diagram describing operation of the identity stage 50 of to determine if a URL is legitimate or suspicious. Input 31 are all URLs from stage 30. This stage includes a multi-classifier identity model 52 of FIG. 3A that in turn classifies each URL monitored from the accessibility stage 30, including the original URL (i.e., URLs 20 and 33-35). Both lexical and host features are extracted before the URL is given a classification. These features extracted pertain to the identity of the URL, hence the name of this stage. There are a total of 255 features extracted at this stage, mainly host features and handful of lexical features.

Since the training dataset does not come from any dedicated open-sourced database, the model aims to classify URLs of the general type. This means that features that require APIs to direct reputation tools (e.g. IoC listing, blocklists, or social media posts) have not been used, as one embodiment does not use APIs to direct reputation services. Indeed, a URL classifier can benefit from third-party sources (such as VirusTotal, AlienVault OTX, or urlscan.io), however, the identity model implements a faster way of classifying fresh and unlisted URLs without the disadvantages of using its APIs (such as cost and time) when deployed to production. Nevertheless, the identity model may include more features from third-party services as a design choice. The advantage of identity model 52 (without APIs) is that it is independent, cost-efficient, and convenient.

Step 304 extracts lexical features from the input URL. Extraction of lexical features is the fastest way of obtaining features pertaining to the identity of the URL. These features are based on the analysis of the URL's structural components, such as the length of the URL, the number of sub-folders in the path, the presence of a file extension, the protocol used (http or https), the domain name length, and so on.

Step 308 extracts host features from the current URL such as URI and domain information. Host features (listed below) require additional dependency from different modules and means that the detection system 10 has an internet connection. The below listed databases are public and do not require payment or special privileges.

WHOIS features describe the contact and technical information of a domain's owners. This includes the registration date of a domain, the status of the domain's server, the indication of the domain owner's country, city, and organization, and the expiration date of the domain ownership.

Domain Name System (DNS) features provides a set of records each of which holds additional information of the domain's servers and metadata. This includes the MX records that contains the domain's mail server, the NS records that contains the domain's name server, the A records that contains IP addresses where the domain is hosted, and SOA records that contains zone information to where the domain belongs. A prominent indicator that a domain is unsafe is if it is not yet verified by cloud services such as Google, Facebook, or Apple; such an indicator can be found in the TXT records.

Secure Sockets Layer (SSL) features supply information of a domain's SSL certificate and the Transport Layer Security (TLS) certificates, which are a more secure version of SSL. The existence of an SSL/TLS certificate indicates that any information passed to and received by the domain is encrypted, it does not necessarily mean that a domain is secure from vulnerabilities. Acquiring an SSL/TLS certificate, however, means additional cost for attackers, which contradicts their means for being as cheap as possible when purchasing domains.

Web Technology features lists the technologies upon which a domain was built. This can be determined by matching keywords found in HTTP headers, cookies, and HTML Web pages with an open database of known technologies such as Wappalyzers. A higher count of implemented technologies can imply a structured and functional legitimate domain, while a lesser count containing only the base technologies can imply a less reputable or possibly compromised domain.

Finally, URLs may come in the form of IP addresses, which may not be suitable for most domain-dependent host features. Registration Data Access Protocol (RDAP) features cover most of the important details of an IP address including the ownership details, the registration and expiration date, and the group (CIDR block) to which the IP address belongs.

Once features have been extracted for a particular URL in step 312 these features are fed into one or more algorithms of the identity model in order to obtain a prediction as to whether the URL is safe or unsafe from each algorithm. Although any number of algorithms may be used, in one particular embodiment the detection system uses three algorithms.

One algorithm is the Extremely Randomized Trees (ERT) algorithm which constructs a group of decision trees based on multiple subgroups of the training data. Specific split conditions on a features value represent the decision nodes inside a decision tree. The output of each tree is a probability of safe or unsafe, depending upon which conditions are satisfied on input. Probabilities from each tree are then aggregated through majority voting to generate the final class prediction of the ERT algorithm. A second algorithm is the CatBoost (CAT) algorithm which also uses decision trees. Each tree is created to minimize the amount of errors of the previous tree. Probabilities from each tree undergo weighted averaging, with the largest weight placed on the decision tree that contributed most towards decreasing errors, in order to produce the final class prediction of the CAT algorithm. A third algorithm is the Feed Forward Neural Network (FFN) in which each node holds the value of a feature. Each weighted output of a node (or "neuron") becomes input of another until it converges to single neuron in the output layer, which represents the final class probability prediction of the FFN.

In step 316 these final predictions from the algorithms for a particular URL are aggregated in order to obtain a final prediction for that URL. FIG. 3B illustrates how outputs from each algorithm may be aggregated. As shown, predictions 57 and 59 indicate a likely unsafe URL, while prediction 58 indicates a likely safe URL. Each prediction is input into one of multiple ways of aggregating the predictions; in this embodiment there is Ensemble Voting 60, Weighted Averaging 61 and Ensemble Stacking 62. Ensemble Voting (EV) is similar to majority voting except the class probabilities undergo certain threshold conditions before a vote is counted. Weighted Averaging (WA) is averaging with weights placed on each algorithm. Ensemble Stacking makes use of a "meta model" that is trained on class probabilities to make a single class prediction; the algorithm used in this meta model is Random Forest, which is like ERT, but the split conditions are optimized, not randomized. Each aggregation manner than outputs its prediction of safe or unsafe as shown at 63-65.

Finally applying a majority voting 66 in each of the aggregations will return the final prediction 67 of the identity model 52 for a particular URL. In this example for a particular URL, even though predictions 57 and 59 indicate unsafe and prediction 58 indicates safe, outputs 63 and 65 from aggregation indicates safe and only output 64 indicates unsafe. Thus, majority voting 66 determines that the URL is safe 67. Considering this example with the original URL, FIG. 1 shows that the final prediction 67 for the original URL is safe.

Figure 9:
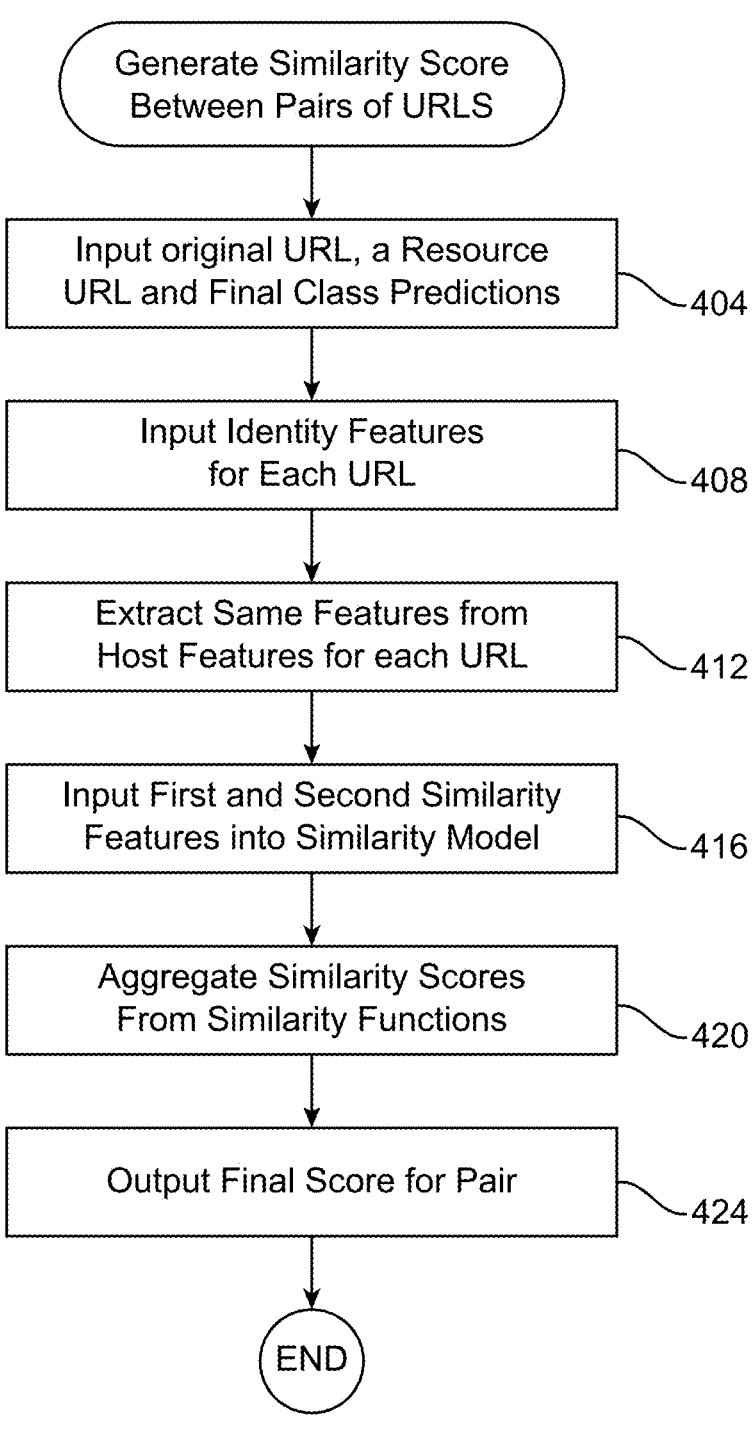

FIG. 9 is a flow diagram describing operation of the similarity stage 70 to determine if two URLs are similar. This stage is a multi-classifier model that aims to generate a final similarity score between a pair of URLs based on the information provided by the Identity Stage 50. Input are the URLs and all features 51 from stage 50. Briefly, lexical information such as URL strings may be included in the distance measurement as well as information found from the databases above. In general, similarity may be calculated by determining how much the information from one URL is related to the information of the other URL (e.g. are both Web sites owned by the same person, do both Web sites reside in the same country, how close are the Web sites in terms of their creation dates, etc.).

The pairings are done by partnering the original URL with each of the resource URLs in turn. The task of generating a similarity score through machine learning is called "Similarity Learning" which means determining the closeness of two entities based upon similarity features. It is commonly used for comparing visual entities such as faces and texts using image features (e.g. colors, patterns, and shapes). For the multi-model detection system 10, the similarity features for a particular URL include the lexical and host features from step 304 and 308, the identity model's final class prediction, and the same features described below.

Step 404 inputs the original URL, one of the resource URLs and the final class prediction from step 316 for each of the URLs. FIG. 4A shows that different pairs of URLs 20 and 33, 20 and 34, and 20 and 35 may be input into the similarity model 72. The final similarity score between a pair of URLs is represented by edge 73 (URLs 20 and 33), edge 74 (URLs 20 and 34), and edge 75 (URLs 20 and 35).

Step 408 inputs the identity features from steps 304 and 308 for each of the URLs. Next, for each URL, in step 412 the same features are extracted from the host features determined in step 308. The same features are a group of feature indicators that determine if some categorical values from a set of WHOIS, DNS, SSL, WEBTECH, and RDAP data is present in another. These specific categorical values were not part of the identity features of step 308 as the number of possible categories is too large for one-hot encoding such as countries, organizations, and servers. For each URL then, the URL, its final class prediction, its identity features and its same features are collectively referred to as the similarity features for that particular URL. For the pair of URLs then, there will be first and second similarity features.

There are a total of 315 features extracted at this stage, mainly identity features. Unlike common applications of similarity learning, these features describe a URL's information and classification rather than its appearance or visual structure.

In step 416 the first and second similarity features of the URL pair are input into the similarity model 72. Although any of a variety of algorithms may be used, the main algorithm of the similarity model is the Siamese Neural Network (SNN). It comprises a twin pair of neural networks, each of which is fed by one of the first and second sets of similarity features, respectively. In this architecture, the output layer of the neural networks can comprise of more than one neuron. Regardless of the size of the neural networks' output, both will be combined by a similarity function (or functions) to a similarity score ranging from 0 to 1, with 1 describing that both URLs are exactly the same, and 0 describing that both are completely different. The underlying structure of this stage only uses this one main algorithm, but there may be one or more similarity functions to produce the final similarity score. In one particular embodiment, five different similarity functions are used.

Step 420 aggregates the similarity scores from the various similarity functions used. FIG. 4B shows the five similarity functions used: Euclidean Distance (EUC) 76, Minkowski Distance of Order 3 (MIN) 77, Pearson Correlation Coefficient (PEA) 79, Jaccard Similarity Index (JAC) 78, and Cosine Similarity (COS) 80. The outputs from these similarity functions may be manipulated, scaled, adjusted, clipped, etc. so that a score of "1" means both URLs are exactly the same and "0" meaning that both are completely different. Of course, only a single similarity function may be used, more than five may be used, and others than these five may be used. Each generates a respective similarity score 81-85 (the larger the box for the score graphically depicting a higher similarity value). Each similarity score 81-85 given by each similarity function will be aggregated through simple averaging 86, which will then be the final score 87 of the similarity model 72.

In step 424 this final score (along with all similarity scores for all pairs) may be output 71 for use by the activity stage 90.

Figure 10:
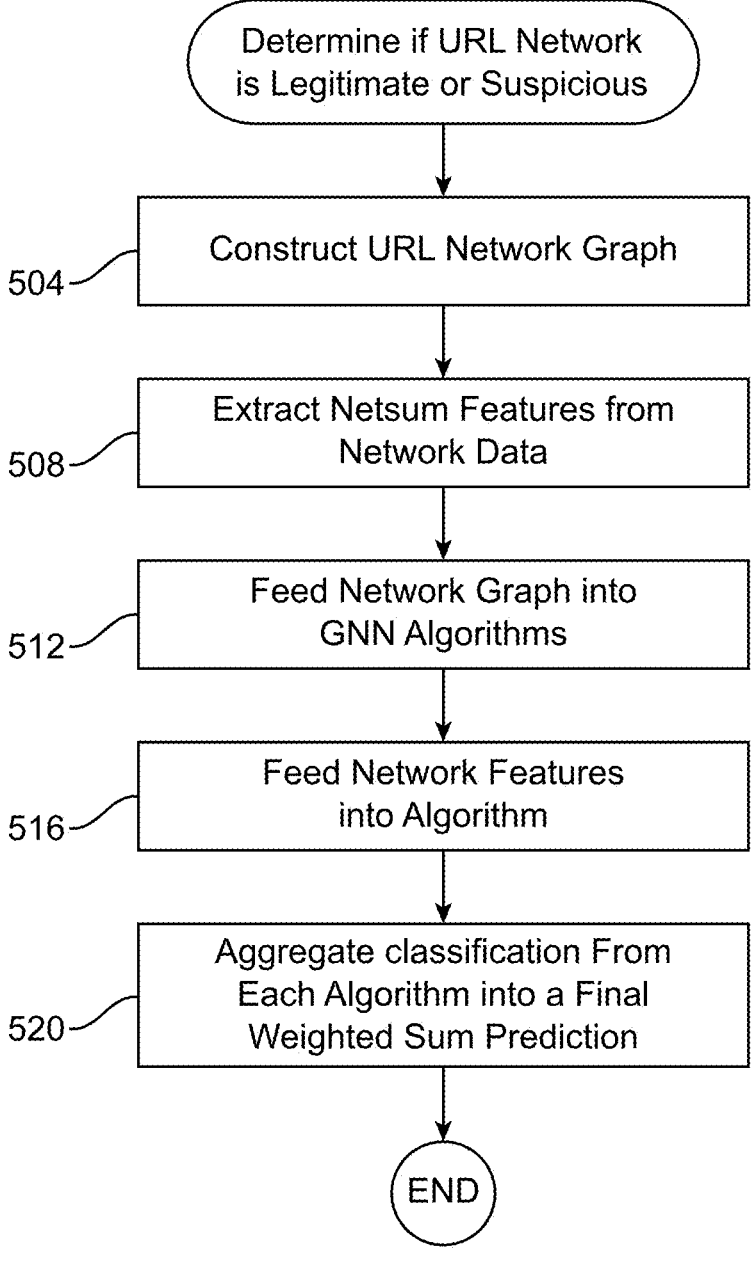
FIG. 10 is a flow diagram describing operation of the activity stage.

FIG. 10 is a flow diagram describing operation of the activity stage 90. This stage represents a multi-classifier activity model 92 that aims to determine if a URL's network is safe or unsafe.

FIG. 5A illustrates activity stage 90 in greater detail. Shown is original URL 20 and its network graph including URLs 33-35 and their corresponding edges 73-75. Activity model 92 includes the four GNN algorithms and classifier algorithm as mentioned above. A final prediction for whether the original URL's network is legitimate or suspicious is output at 94.

In step 504 the network graph for the original URL is constructed and may be constructed incrementally as each stage executes. The network graph of original URL 20 is structurally defined by the accessibility stage 30 and is annotated with features extracted during the accessibility 30, identity 50, and similarity 70 stages. As shown, the structure of the network graph for URL 20 is a star topology which consists of a central node and neighboring nodes surrounding it (the URLs collected during the accessibility stage). The central node of the graph is the original URL 20, and the surrounding nodes are the resource URLs 33-35. Each node also holds the corresponding URL's identity features and predictions from the identity stage. Input 31 to the activity model are all URLs from stage 30 as shown. Also input are the URLs and all features 51 from stage 50.

This topology assumes that the network graph does not follow a linear path when encountering URL redirections and requests made by scripts and prioritizes the original URLs in the context of its resource URLs-which is a more appropriate use case for the underlying algorithms. If the network graph does follow a linear path (depending upon the redirections and requests) then other topologies are possible. For example, remapping of the network graph may be done in which the network graph is revised to accommodate second level edges on certain behaviors (e.g. redirections representing a straight line of nodes with branches to outside nodes representing retrieval of script or download links).

Edges may represent weight, types of attributes, including the network features from the accessibility stage (i.e., either the network response code or network resource type, or all of the network information and features), or the similarity scores from the similarity stage, depending on to which algorithm the graph is fed.

In step 508 the activity or "netsum" features are extracted from the network data. Netsum features describe the summary of the network activity for an original URL. This can include the number of times a URL initiated a network request, the number of images requested divided by the number of requests, the frequency of a URL to request a script, the count of successful responses within the original URLs network based upon the response status code, the number of unsafe URLs classified by the identity model, and the average similarity score present within the network, etc.

The stage composes of one simple classifier algorithm and four algorithms relating to Graph Neural Networks (GNN). GNN are machine learning algorithms that considers individual data points and learns the connections and relationships between them to create predictions or uncover patterns. The use of GNNs is advantageous when it comes to classifying URLs using the network.

In step 512 the network graph is fed into any number of GNN algorithms 92. In one particular embodiment, four GNNs are used and the first GNN algorithm is the Graph Convolution Network (GCN) whose task is to give meaningful representations to each node embedding in a graph. Embeddings are defined as the learnt data coming from the features of the network graph. It does this by aggregating a node's features and the features of its neighboring connected nodes by performing graph convolution using a convolution operation. In most GCN applications, defining edge weights is entirely optional and defaults to a value of "1." In this embodiment, edge weights are defined by the similarity score for the pair given from the similarity model 72. For each node to be updated with meaningful embeddings, all normalized embeddings from its neighboring nodes, including its own, undergo summation, which is then multiplied by a weight defined in the weight matrix. Finally, a classification of whether the URL network is legitimate or suspicious is output.

A second GNN algorithm is the Relational Graph Convolution Network (RGCN) which is similar to the GCN except that it can handle directed graphs, graphs with different types of edges. Network features are used to define edge types between the original URL and the resource URLs. For example, an edge type may be: documents, scripts and texts; typefaces and style sheets; audios, videos, images and media; applications and models; fetches, Web sockets, pings and preflight; and multipart and others. For this algorithm, the network request resource type is used, which classifies the edges based on the type of resource the original URL is requesting. This additional data is counted as behaviors which can conclude the type of the original URL (e.g. executing multiple scripts means a resource-heavy Web site or requesting multiple images means an image hosting service). To optimize the algorithm, several related resource types are grouped. Further, instead of using one learnable weight matrix, it is varied for each edge type. In this manner, node embeddings are updated by combining all embeddings from its neighboring nodes across each edge types. Finally, a classification of whether the URL network is legitimate or suspicious is output.

A third GNN algorithm is the Fast Relational Graph Convolution Network (FRGCN). This algorithm is the same as the RGCN but is faster in terms of iterating over each edge type at the expense of increased memory usage. Network response status codes are used as edge types, and like network request resource types, the status codes are represented as behaviors of the original URL that help describe successful or unsuccessful connections at resources it is requesting. Response status codes include informational responses, successful responses, redirection responses, client error responses, and server error responses.

A fourth GNN algorithm is the GATV2 (based on the Graph Attention Networks) in which edge weights are computed based upon the network features extracted from the accessibility stage 30. Unlike the GCN algorithm, where normalization is applied to a node's embeddings in order to avoid dominating its convolution process (leading to trivial resource URLs such as media links being treated of equal importance as relevant resource URLs such as external scripts when updating the original URL's node embeddings), the GAT solves this problem by making use of the embeddings themselves to assign different attention weights to each neighboring node. A classification of whether the URL network is legitimate or suspicious is output.

In step 516 the network features are also fed into a simple classifier algorithm, in this case the Gradient Boosting Classifier (GBC) which, unlike the other GNN algorithms, is not a form of GNN and closely resembles the CAT of the identity stage of 50. The motivation for using this classifier is to capture unseen patterns found in a network graph when summarized into a lower dimension, a task which is not appropriate for GNNs. For this purpose, the netsum features are primarily used, which are then mapped to each of the original URLs before being fed into the GBC algorithm. The GBC creates decision trees, each of which learns the error from its predecessor. All of the trees are combined to result in a final classification.

In step 520 each of the output classifications from the five above algorithms are aggregated to form a final prediction 94. As shown in FIG. 5B, the classifications 102-106 respectively from each of the trained algorithms 96-100 are aggregated using a weighted sum 108 (in order to prioritize the strongest models). If the weighted sum is larger than a predefined threshold, it predicts the URL's network 94 as being unsafe.

As mentioned above, FIG. 6 shows finality stage 120 including a condition such as specific condition 72 pertaining to classification results 53 and 94 for the original URL. This finality stage using this specific condition produces an unsafe classification if either identity model 52 or activity multiple 92 returns an unsafe classification, otherwise the original URL is deemed safe. The motivation for this condition is that both the identity and activity models complement each other in detecting unsafe URLs. Identity model 52 specializes in classifying URLs of the general type at face value; activity model 92 classifies specific and accessible URLs based on contexts. The third stage, similarity stage 70, is not used in the condition because it is trained on artificial (not actual) labels and its output is used to improve the classification of the activity stage 90.

Computer System Embodiment

Figures 11A, 11B:
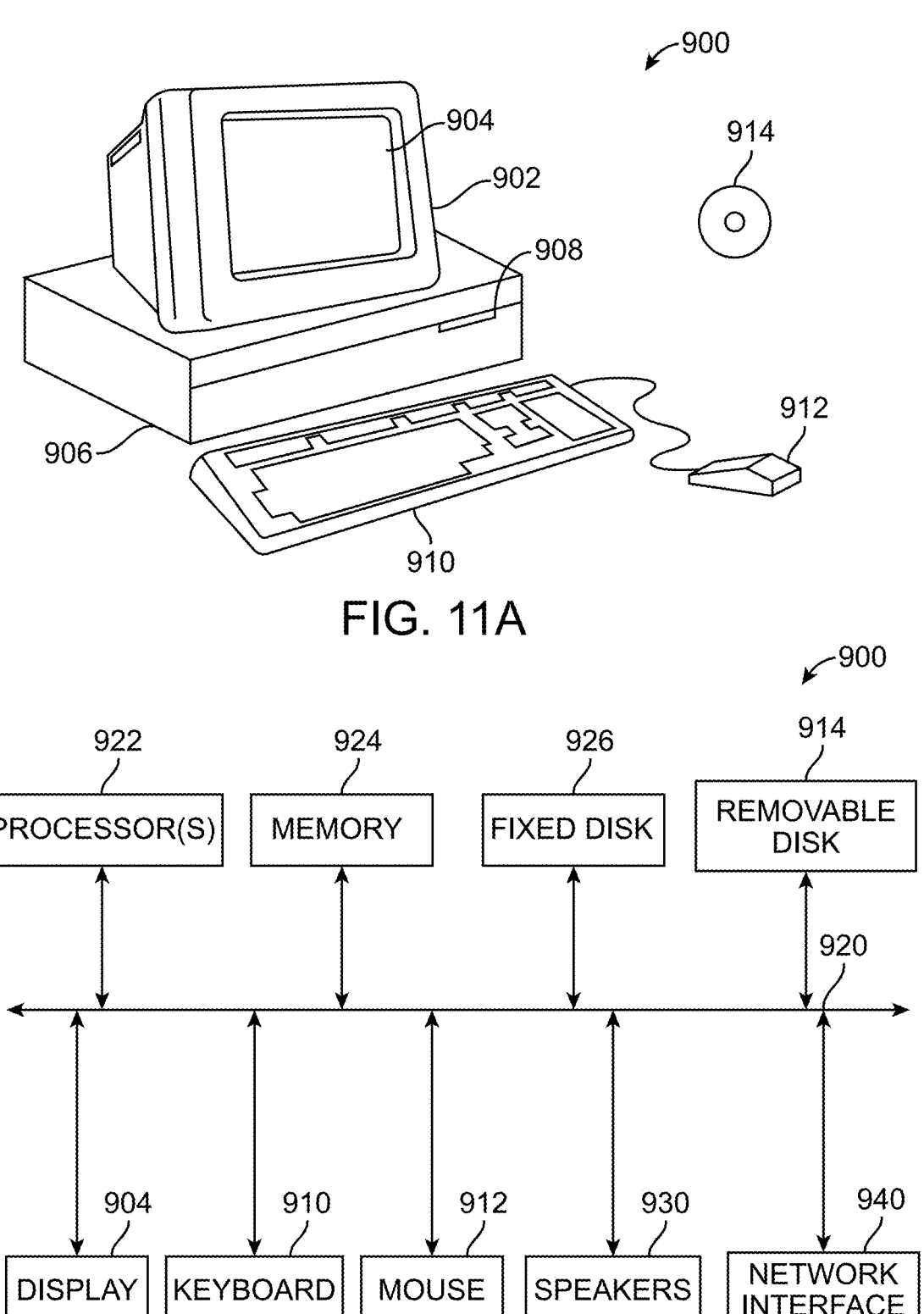
FIGS. 11A and 11B illustrate a computer system suitable for implementing embodiments of the present invention.

FIGS. 11A and 11B illustrate a computer system 900 suitable for implementing embodiments of the present invention. FIG. 11A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 11B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape;

optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

I claim:

1. A method of classifying a uniform resource locator (URL) said method comprising:
   requesting an input URL by a virtual browser;
   collecting a plurality of resource URLs requested by said input URL to form a network graph comprising nodes representing said input URL and said resource URLs and edges linking said input URL to each of said resource URLs;
   determining, using an identity model, whether said input URL is malicious or benign using features pertaining to the identity of said input URL;
   determining, using an activity model, whether a network of said input URL is malicious or benign using said network graph and said edges;
   determining that said input URL is malicious when said identity model determines that said input URL is malicious or said activity model determines that said input URL's network is malicious.

2. A method as recited in claim 1 wherein said virtual browser requests said input URL with no human input.

3. A method as recited in claim 1 wherein each edge of said network graph is a similarity score between said input URL and one of said resource URLs.

4. A method as recited in claim 1 wherein said activity model also uses network features extracted during said requesting as edges of said network graph.

5. A method as recited in claim 1 wherein said steps of claim 1 do not use any paid or trial-based third-party services for feature extraction.

6. A method as recited in claim 1 wherein said determining using an activity model uses at least one Graph Neural Network (GNN) algorithm.

7. A method as recited in claim 1 wherein said steps of claim 1 do not extract keywords from a Web page as features.

8. A method as recited in claim 3 wherein said similarity score relies upon URL metadata and not upon images of said URL.

9. A method as recited in claim 1 wherein said determining using an activity model further comprises:

extracting network activity features from data of the network graph to determine whether a network of said input URL is malicious or benign.

10. A method as recited in claim 6 wherein said determining using an activity model further comprises:
   using a classifier algorithm which is not a GNN.

11. A method of classifying a uniform resource locator (URL) said method comprising:
   requesting an input URL by a virtual browser;
   collecting a plurality of resource URLs requested by said input URL to form a network graph comprising nodes representing said input URL and said resource URLs and edges linking said input URL to each of said resource URLs;
   determining, using an identity model, whether said input URL is malicious or benign using host features of said input URL;
   determining, using an activity model, whether a network of said input URL is malicious or benign using said network graph and said edges;
   determining that said input URL is malicious when said identity model determines that said input URL is malicious or said activity model determines that said input URL's network is malicious.

12. A method as recited in claim 11 wherein said identity model has a connection to the Internet.

13. A method as recited in claim 11 wherein said virtual browser requests said input URL with no human input.

14. A method as recited in claim 11 wherein each edge of said network graph is a similarity score between said input URL and one of said resource URLs.

15. A method as recited in claim 11 wherein said activity model also uses network features extracted during said requesting as edges of said network graph.

16. A method of classifying a uniform resource locator (URL) said method comprising:
   requesting an input URL by a virtual browser;
   collecting a plurality of resource URLs requested by said input URL to form a network graph consisting of said input URL and said resource URLs;
   determining, using an identity model, whether said input URL is malicious or benign using lexical features of said input URL, wherein said lexical features are based upon the structural components of said input URL;
   determining, using an activity model, whether a network of said input URL is malicious or benign using said network graph;
   determining that said input URL is malicious when said identity model determines that said input URL is malicious or said activity model determines that said input URL's network is malicious.

17. A method as recited in claim 16 wherein said virtual browser requests said input URL with no human input.

18. A method as recited in claim 16 wherein each edge of said network graph is a similarity score between said input URL and one of said resource URLs.

19. A method as recited in claim 16 wherein said activity model also uses network features extracted during said requesting as edges of said network graph.

* * * * *